United States Patent
Wagener et al.

(10) Patent No.: US 11,067,174 B2
(45) Date of Patent: Jul. 20, 2021

(54) METHOD FOR PROCESSING A CYLINDER

(71) Applicant: Bayerische Motoren Werke Aktiengesellschaft, Munich (DE)

(72) Inventors: Wolfram Wagener, Geisenhausen (DE); Patrick Woisetschlaeger, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/575,053

(22) Filed: Sep. 18, 2019

(65) Prior Publication Data
US 2020/0011418 A1    Jan. 9, 2020

Related U.S. Application Data

(63) Continuation of application No. PCT/EP2018/060733, filed on Apr. 26, 2018.

(30) Foreign Application Priority Data

May 4, 2017    (DE) .................. 10 2017 207 455.8

(51) Int. Cl.
*F16J 10/04*    (2006.01)
*F16J 10/02*    (2006.01)

(52) U.S. Cl.
CPC .............. *F16J 10/02* (2013.01); *F16J 10/04* (2013.01)

(58) Field of Classification Search
CPC .... F16J 10/00; F16J 10/02; F16J 10/04; F02F 1/00; F02F 1/004; F02F 1/16; F02F 1/18; F02F 1/20
See application file for complete search history.

(56) References Cited

U.S. PATENT DOCUMENTS

| 2,292,662 | A | | 8/1942 | Sanders |
| 3,808,955 | A | * | 5/1974 | Hamada .................. F02F 1/18 92/169.1 |
| 5,630,953 | A | | 5/1997 | Klink |
| 5,934,239 | A | * | 8/1999 | Koriyama ............... F16J 10/04 123/193.2 |

(Continued)

FOREIGN PATENT DOCUMENTS

| CN | 1340110 A | 3/2002 |
| CN | 202611898 U | 12/2012 |

(Continued)

OTHER PUBLICATIONS

International Search Report (PCT/ISA/210) issued in PCT Application No. PCT/EP2018/060733 dated Aug. 6, 2018 with English translation (seven (7) pages).

(Continued)

*Primary Examiner* — Michael Leslie
(74) *Attorney, Agent, or Firm* — Crowell & Moring LLP

(57) ABSTRACT

A method for processing an inner wall of a cylinder of an internal combustion engine includes providing a cylinder and processing an inner wall of the cylinder. The cylinder extends along a cylinder axis. The inner wall of the cylinder is processed in such a manner that at least one first structural region and one second structural region are formed along the cylinder axis. A geometry of the first structural region differs in design from a geometry of the second structural region.

11 Claims, 1 Drawing Sheet

(56) References Cited

U.S. PATENT DOCUMENTS

| | | |
|---|---|---|
| 2002/0025386 A1 | 2/2002 | Heinemann et al. |
| 2003/0010201 A1 | 1/2003 | Takahashi et al. |
| 2010/0031799 A1 | 2/2010 | Ast et al. |

FOREIGN PATENT DOCUMENTS

| | | |
|---|---|---|
| CN | 206035657 U | 3/2017 |
| DE | 43 16 012 A1 | 11/1994 |
| DE | 196 14 328 A1 | 10/1997 |
| DE | 601 31 096 T2 | 2/2008 |
| DE | 10 2008 058 452 A1 | 2/2010 |
| DE | 10 2010 014 689 A1 | 10/2011 |
| WO | WO 00/37789 A1 | 6/2000 |
| WO | WO 02/40850 A1 | 5/2002 |

OTHER PUBLICATIONS

German-language Written Opinion (PCT/ISA/237) issued in PCT Application No. PCT/EP2018/060733 dated Aug. 6, 2018 (five (5) pages).

German-language Search Report issued in counterpart German Application No. 10 2017 207 455.8 dated Dec. 18, 2017 with partial English translation (12 pages).

English translation of Chinese language Office Action issued in Chinese Application No. 20188001864.4 dated Dec. 1, 2020 with (seven (7) pages).

\* cited by examiner

METHOD FOR PROCESSING A CYLINDER

CROSS REFERENCE TO RELATED APPLICATIONS

This application is a continuation of PCT International Application No. PCT/EP2018/060733, filed Apr. 26, 2018, which claims priority under 35 U.S.C. § 119 from German Patent Application No. 10 2017 207 455.8, filed May 4, 2017, the entire disclosures of which are herein expressly incorporated by reference.

BACKGROUND AND SUMMARY OF THE INVENTION

Embodiments of the present invention relate to a method for processing a cylinder, in particular an inner wall of a cylinder, and to a cylinder of an internal combustion engine.

In the art of manufacturing internal combustion engines, the inner surfaces of cylinders, in particular of aluminum crankcases, are provided with a coating, applied, for example, by means of a thermal spraying method. The coating process is preceded by what is referred to as activation of the inner surface of the cylinder, which serves for (better) adhesion of the coating. Said activation comprises, for example, mechanical processing of the cylinder wall by introducing grooves/webs which are optionally also deformed in a subsequent forming or deforming step in such a manner that undercuts arise which permit interlocking with the coating. However, these methods have proven very time- and cost-intensive or not suitable for reliably ensuring permanent fastening of the coating.

It is therefore an object of the present invention to specify a method for processing a cylinder and a cylinder which eliminate the aforementioned disadvantages and in particular afford time and cost advantages.

This object is achieved by the inventive method and by the inventive cylinder presented herein. According to the embodiments of the invention, a method for processing a crankcase or an inner wall of a cylinder, in particular a cylinder of an internal combustion engine, comprises the acts of:

providing a cylinder or a crankcase which comprises at least one cylinder, wherein the cylinder extends along a cylinder axis;

processing an inner wall of the cylinder in such a manner that at least one first structural region or one second structural region are formed along the cylinder axis, wherein a geometry of the first structural region differs in design from a geometry of the second structural region.

The aforementioned structural regions, or else activation regions, serve in particular for activating the cylinder surface/inner surface of the cylinder before a coating subsequently takes place, in particular a thermal coating. One significant advantage here consists in that the structuring/activation along the cylinder axis differs in design, and therefore account can advantageously be taken of the different requirements or else loading of the cylinder along its cylinder axis. It has thus been shown that not all activation or structuring methods are equally readily suitable over the length of the cylinder, and therefore structural regions which are perhaps suitable on an upper region of the cylinder have proven somewhat disadvantageous in the central region, or vice versa, etc. Added to this is the fact that, during the later operation, the cylinder is exposed to different loadings along its cylinder axis. Thus, the cylinder wall is exposed to the highest temperatures, in particular in the upper region, i.e. in the region of the combustion chamber, while the cylinder wall is exposed to high mechanical loadings in the region of the lower dead center of the piston, because of the reversal in direction of said piston. Corresponding loadings resulting from the high piston speed, etc. occur in the central cylinder region. By means of a different activation or structuring of the cylinder wall along its cylinder axis or along its vertical axis, these influences can advantageously be taken into consideration or the fastening of the coating can be optimally configured. "Optimally" should be understood here in the respect that the activation or structuring is selected in the best possible manner in respect of its position in the cylinder, depending on the respective geometry, the quality and/or the properties of the activation/structuring or of the structural region(s). "Optimally" can also mean that an activation/structuring optionally has to take place in a less complicated manner in the regions in which there are lower demands on the coating. According to one embodiment, more than two different structural regions, for example three or four can also be provided, which all have a geometry different from one another, with a different geometry also being understood as meaning that grooves/webs which form the structural regions have different dimensions. However, it should be mentioned at this juncture that the activation/structuring is not limited to the introduction of, for example, grooves/webs, but also use can be made of other geometries which are suitable for interlocking with the subsequent coating. First and second structural regions can also be arranged in an alternating manner along the cylinder axis, etc.

According to an embodiment, the method also comprises the act of:

introducing a parallel groove structure, which runs perpendicularly to the cylinder axis, for forming the first structural region.

The parallel groove structure is preferably introduced with the aid of a metal-cutting method, for example by means of a saw blade or saw tooth or a cutting insert. Alternatively or additionally, a laser can also be used. The provision of the parallel groove structure, which runs perpendicularly to the cylinder axis, advantageously provides an extremely exact activation, in particular circumferentially, in the first structural region. According to one embodiment, the grooves/webs are arranged spaced apart uniformly from one another and are introduced, for example, by means of a tool which comprises a corresponding number of saw blades. This permits very short cycle times.

According to an embodiment, the method also comprises the act of:

introducing a helical groove structure for forming the second structural region.

The helical groove structure is expediently also produced by means of metal-cutting processing, for example by means of use of cutting inserts or indexable inserts. The helical shape permits very high processing speeds and therefore low cycle times.

The method may also comprise the acts of:

positioning/forming the first structural region in an upper portion of the cylinder;

positioning/forming the second structural region in a central portion of the cylinder.

The method may also comprise the act of:

positioning/forming the first structural region in a lower portion of the cylinder.

The lower structural region here is that region of the cylinder which is oriented in the direction of the crankshaft. Said region, at least for the most part, optionally no longer has any contact with the cylinder during operation, but, if the coating is insufficient, problems, in particular layer delaminations, may occur here in particular during the honing, i.e. after the thermal coating. The parallel groove structure, which runs perpendicularly to the cylinder axis, is preferably provided at the beginning of the cylinder and at the end of the cylinder while the helical groove structure is introduced in the center of the cylinder. The great advantage consists in that the flat grooving, i.e. the introduction of the parallel grooves, at the beginning of the cylinder and at the end of the cylinder means that there is no risk of layer fracturing. In the center of the cylinder, the grooving of a helical shape permits high speeds and low cycle times. It should be mentioned at this juncture that the helical cutting, for example with an indexable insert, basically involves the disadvantage that there is a defined beginning of the groove and a defined end of the groove, as a result of which, at the beginning and end of the helix, regions arise which are as it were "unprocessed", cf., for example, the beginning and the end of a metric thread. During the honing or in the later operation of the engine, flaking of the coating may occur here because the layer is not sufficiently interlocked. The provision of parallel grooves, for example, via a tool having one or more saw blades arranged correspondingly in parallel and spaced apart from one another can have advantages here, but is significantly more time-consuming. It has therefore proven particularly advantageous to combine the two approaches in one method.

The parallel groove structure expediently has 2-8, preferably 3-5, webs. This suffices in order to ensure secure and defined conditions for the coating in the starting region and end region of the cylinder. By means of two consecutive webs, as seen along the cylinder axis, a groove is formed which has a width of expediently approximately 150-450 µm, preferably of approximately 250-350 µm. In preferred embodiments, the web width lies within a range of approximately 100-400 µm, in particular within a range of approximately 200-300 µm. The same applies to the depth of the grooves. At this juncture, it should be mentioned that the discussion here is generally about a groove structure. In parallel or analogously, a web structure is produced together with the groove structure.

According to an embodiment, the method also comprises the acts of:
  forming an end web in a region of a subsequent bevel, in particular an inlet and outlet bevel, of the cylinder;
  roughening at least the end web.

In some embodiments, the end web has a width which protrudes over a width of the other webs by two to six times, preferably three to four times. The length of the end web makes it possible to ensure that the bevel to be introduced later, in particular the aforementioned inlet and outlet bevel, cuts or bevels said end web. In particular if the latter is structured or roughened, it can be ensured that at least a micro-interlocking of the coating is achieved. If, for example, the aforementioned bevel does not cut the web, but rather a groove or a groove base which in particular is "smooth", this can lead to flaking, etc., because of the insufficient adhesion of the coating.

The end web is preferably a portion of the first structural region.

The method may also comprise the act of:
  processing the at least one first and second structural region by forming. The processing by forming can be provided in order to deform the aforementioned webs of the first and second structural region in such a manner that undercuts are formed. As a result, the grooves have an approximately dovetail-shaped structure in cross section. Alternatively, said geometry is also produced by metal-cutting alone, but this may possibly be more complicated.

Expediently, not only the end web, but rather the entire cylinder wall is roughened. The roughening of the inner wall of the cylinder preferably takes place after the forming. The roughening can take place mechanically, for example by a grinding or rubbing process or by impressing a structure, for example by means of a coated tool. Alternatively, other techniques, such as lasers, can also be used.

According to an embodiment, the method may comprise the act of:
  coating the inner wall, in particular after the activation thereof.

Thermal spraying is preferably used for the coating, wherein, for example, what is referred to as flame spraying or plasma spraying or arc spraying is used. Powder particles and/or wire particles having high thermal and kinetic energy are hurled or sprayed here onto the surface of the substrate to be coated.

Furthermore, the method may comprise the act of:
  introducing a bevel in the region of the end web or bevels in the region of the end webs.

The resulting advantages have already been mentioned further above. According to an embodiment, after introduction of the bevel or bevels, at the inlet and outlet of the cylinder, the inner wall of the cylinder is honed.

The method may also comprise the act of:
  connecting the first and the second structural region.

In particular, this means that the groove structure of the first structural region and of the second structural region advantageously merge together or the parallel groove runs, for example, into the adjoining helical groove, and vice versa.

The embodiments of the invention are also directed to a cylinder, in particular a cylinder of a crankcase of an internal combustion engine, wherein the cylinder extends along a cylinder axis and has a coating, wherein the cylinder has at least one first structural region and one second structural region along the cylinder axis for fastening the coating, and wherein the geometry of the first structural region differs in design from a geometry of the second structural region. Expediently, by means of the different structural regions and the different activation, account can be taken in the best possible way of the respective advantages and disadvantages of the respective activation methods. In addition, the requirement for fastening the coating can be addressed in the best possible way.

According to an embodiment, the first structural region has a parallel groove structure which is oriented perpendicularly to the cylinder axis, wherein the second structural region has a helical groove structure.

Preferably, an upper and a lower end region of the cylinder have the first structural region, and a region located in between has the second structural region. The flat grooving therefore preferably does not give rise at the beginning of the cylinder and at the end of the cylinder to any risk of layer fracturing, while, because of the helical shape of the groove structure in the center of the cylinder, low cycle times can be realized during the manufacturing.

According to an embodiment, a ratio of a length of the first structural region to an overall length of the cylinder lies within a range of approximately 0.001 to approximately 0.2. In other words, for example, the first structural region preferably takes up a length of approximately 1-2 mm, in the case of a cylinder bore of approximately 82-84 mm or a cylinder length of approximately 145 mm.

The first structural region preferably comprises 2-8, preferably 3-5 webs. According to various embodiments, a pitch angle of the helix of the second structural region lies, for example, within a range of approximately 5 to 40°.

The cylinder preferably ends on the upper side and/or on the lower side in an end web, wherein the end web has a width which clearly exceeds a width of the remaining webs. The width preferably lies within a range of approximately 1-3 mm.

According to an embodiment, the end web is beveled. The bevel can be a single bevel or else a multiple bevel, such as a double bevel. The length of the end web ensures that the end web is also actually beveled and the (end) bevel does not run, for example, through a base of a groove.

The advantages and features mentioned in conjunction with the method apply analogously and correspondingly also for the cylinder, and vice versa. Further advantages and features emerge from the description below of a method or a cylinder with respect to the attached figures.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
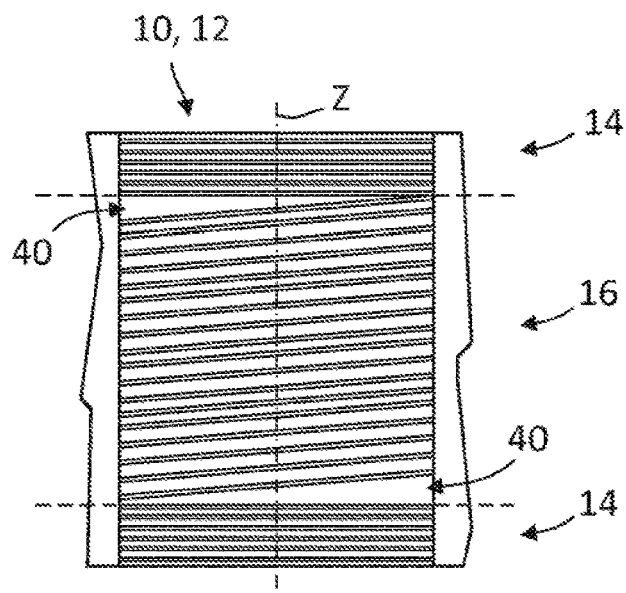
FIG. 1 is a schematic view of an embodiment of a cylinder in a sectional illustration.

FIG. 1 shows a schematic sectional illustration of a cylinder 10 which extends along a cylinder axis Z. A cylinder wall 12 or an inner surface of the cylinder 10 comprises a multiplicity of webs or grooves which, for reasons of clarity, are not further provided with reference signs. However, it can clearly be seen that the cylinder 10 comprises essentially three regions along its vertical axis Z, wherein a first structural region 14 can be seen in particular at the upper and lower end, and a second structural region 16 can be seen in a central region, wherein the first structural regions 14 are distinguished by a substantially parallel groove structure which extends substantially perpendicularly to the cylinder axis Z, and wherein the second structural region 16 has a substantially helical groove structure. In such a cylinder 10, because of the advantageous configuration of the first structural region 14, that is in particular because of the flat grooving, there is no risk at the beginning of the cylinder and at the end of the cylinder of layer fracturing. Provision of the helical shape in the center of the cylinder makes an extremely short cycle time possible during production. The regions which are denoted by the reference sign 40 will be discussed in more detail below.

Figure 2:
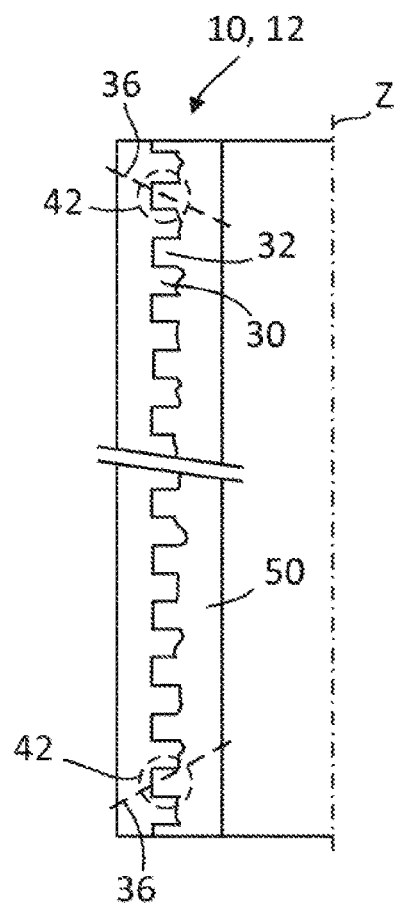
FIGS. 2 and 3 are two detailed views of cylinder walls for clarifying a function of an end web.

FIG. 2 shows a section through a cylinder 10 or a cylinder wall 12, wherein the cylinder 10 extends along a vertical axis Z. Only half of the cylinder 10 is illustrated here. A groove structure comprising a multiplicity of webs 30 and grooves 32 lying in between can be seen. The dashed lines 36 sketch the profile of an inlet or outlet bevel to be introduced later into the cylinder 10. Reference sign 42 indicates critical regions. It can thus be seen here that, after introduction of the bevels, a coating 50, as sketched by the lines 36, lies against a groove base and also cannot be interlocked between two webs 30. With reference to the regions shown in FIG. 1 by reference sign 40, this is not a problem since although here, illustrated in exaggerated form, there is a large distance between the grooves along the cylinder axis, the coating can ultimately be held as before via two webs. This is not provided in the region of the end of the cylinder or beginning of the cylinder.

Figure 3:
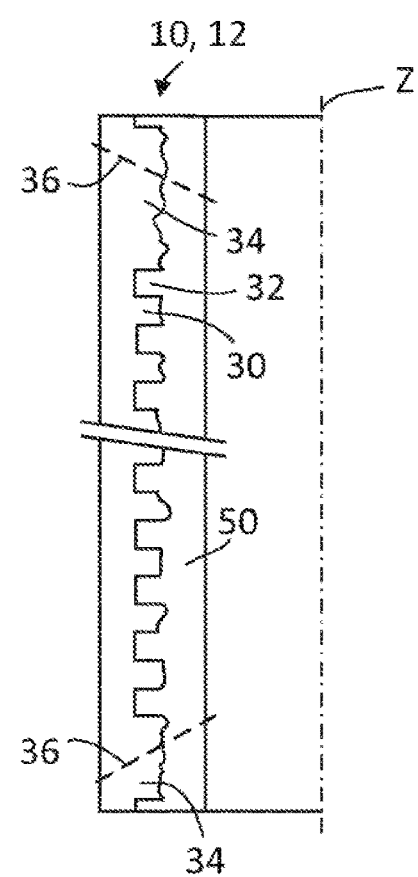

FIG. 3 now shows that it can be reliably ensured with a corresponding end web 34 that corresponding inlet and outlet bevels (cf. 36) run through a web and not through a "smooth" groove base. It is schematically illustrated that the surface of the cylinder wall 12, in particular also of the end web 34, is additionally roughened, as a result of which secure interlocking of the coating 50 is fully achieved.

LIST OF REFERENCE SIGNS

10 Cylinder
12 Cylinder wall, inner wall
14 First structural region
16 Second structural region
30 Web
32 Groove
34 End web
36 (End) bevel, inlet/outlet bevel
40 Region
42 Critical region
50 Coating
Z Cylinder axis The foregoing disclosure has been set forth merely to illustrate the invention and is not intended to be limiting. Since modifications of the disclosed embodiments incorporating the spirit and substance of the embodiments of the invention may occur to persons skilled in the art, the invention should be construed to include everything within the scope of the appended claims and equivalents thereof.

What is claimed is:

1. A method for processing an inner wall of a cylinder of an internal combustion engine, comprising the acts of:
   providing a cylinder, which extends along a cylinder axis;
   processing an inner wall of the cylinder in such a manner that at least one first structural region and one second structural region are formed along the cylinder axis;
   forming a plurality of parallel groove structure, which run perpendicularly to the cylinder axis, in the first structural region; and
   forming a plurality of helical groove structures in the second structural region, the plurality of helical groove structures being parallel to one another and oblique to the plurality of parallel groove structures, wherein
   a geometry of the first structural region differs in design from a geometry of the second structural region, and
   the processing act that creates the first and second structural regions is completed before any thermal coating is performed.

2. The method according to claim 1, further comprising the acts of:
   positioning/forming the first structural region in an upper portion of the cylinder; and
   positioning/forming the second structural region in a central portion of the cylinder.

3. The method according to claim 1, wherein the parallel groove structure comprises 2 to 8 webs.

4. The method according to claim 3, further comprising the acts of:

forming an end web in a region of an inlet or outlet bevel, of the cylinder; and roughening at least the end web.

5. The method according to claim 4, further comprising the act of:

processing the at least one first structural region and second structural region by forming.

6. The method according to claim 5, further comprising the act of:

coating the inner wall.

7. The method according to claim 4, further comprising the act of:

introducing a bevel in the region of the end web.

8. The method according to claim 1, further comprising:

forming an end web at ends of the cylinder, wherein the end web is beveled.

9. A structure of a crankcase, comprising:

a cylinder that extends along a cylinder axis and has a coating, wherein the cylinder has at least one first structural region and one second structural region along the cylinder axis for fastening the coating, a geometry of the first structural region differs in design from a geometry of the second structural region, the cylinder ends in an end web, the end web is beveled, the first structural has a parallel groove structure which is oriented perpendicularly to the cylinder axis, and the second structural region has a helical groove structure.

10. The structure according to claim 9, wherein an upper and a lower end region of the cylinder have the first structural region, and a region located in between has the second structural region.

11. The structure according to claim 9, wherein the first structural region comprises 2 to 8 webs.

* * * * *